(12) United States Patent
Wang et al.

(10) Patent No.: US 9,913,176 B2
(45) Date of Patent: Mar. 6, 2018

(54) UE CONTEXT IDENTIFICATION METHOD, UE AND BASE STATION

(71) Applicant: FUJITSU LIMITED, Kawasaki-shi, Kanagawa (JP)

(72) Inventors: Weiwei Wang, Beijing (CN); Zhaojun Li, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/590,391

(22) Filed: Jan. 6, 2015

(65) Prior Publication Data
US 2015/0126198 A1 May 7, 2015

Related U.S. Application Data

(63) Continuation of application No. PCT/CN2012/079428, filed on Jul. 31, 2012.

(51) Int. Cl.
*H04W 36/00* (2009.01)
*H04W 76/02* (2009.01)
*H04W 88/08* (2009.01)

(52) U.S. Cl.
CPC ... *H04W 36/0033* (2013.01); *H04W 36/0072* (2013.01); *H04W 76/027* (2013.01); *H04W 88/08* (2013.01)

(58) Field of Classification Search
CPC ......... H04W 36/0033; H04W 36/0072; H04W 76/027; H04W 88/08
(Continued)

(56) References Cited

U.S. PATENT DOCUMENTS

| 8,755,286 B2 | 6/2014 | Tamura et al. |
| 2009/0196259 A1 | 8/2009 | Pani et al. |

(Continued)

FOREIGN PATENT DOCUMENTS

| CN | 101938757 A | * | 1/2011 | ............ H04W 24/08 |
| CN | 101959263 A | * | 1/2011 | |

(Continued)

OTHER PUBLICATIONS

Nokia Siemens Netowrks, The way forward for intra-LTE MRO enchancements, 3GPP TSG-RAN WG3 Meeting#75, Dresden, Germany, Feb. 6-10, 2012.*

(Continued)

*Primary Examiner* — Tanmay Shah
(74) *Attorney, Agent, or Firm* — Myers Wolin, LLC (57) ABSTRACT

Embodiments of the present disclosure provide a UE context identification method, UE and a base station. The identification method includes: obtaining a first terminal identity of the UE by the first base station, wherein the first terminal identity is transmitted by the UE to a network side after connection failure; finding a second terminal identity corresponding to the second base station in a context of the UE according to the first terminal identity; and transmitting to the second base station a handover report containing the second terminal identity, so that the second base station finds the context of the UE according to the second terminal identity. With the embodiments of the present disclosure, it is ensured that the base station is able to identify a context of the UE.

15 Claims, 5 Drawing Sheets

(58) Field of Classification Search
USPC .......................................................... 455/437
See application file for complete search history.

(56) References Cited

U.S. PATENT DOCUMENTS

| | | | |
|---|---|---|---|
| 2011/0026518 A1* | 2/2011 | Jin | H04L 61/106 370/352 |
| 2011/0117908 A1 | 5/2011 | Huang et al. | |
| 2011/0207485 A1 | 8/2011 | Dimou et al. | |
| 2011/0269426 A1 | 11/2011 | Hultin et al. | |
| 2012/0157156 A1 | 6/2012 | Han et al. | |
| 2012/0218970 A1* | 8/2012 | Westberg | H04L 67/28 370/331 |
| 2013/0003700 A1 | 1/2013 | Zhang et al. | |
| 2013/0331105 A1 | 12/2013 | Olofsson et al. | |
| 2015/0031363 A1* | 1/2015 | Kordybach | H04W 36/0094 455/436 |

FOREIGN PATENT DOCUMENTS

| | | |
|---|---|---|
| JP | 2015-505227 A | 2/2015 |
| KR | 10-2012-0053075 A | 5/2012 |
| WO | 2011/039969 A1 | 4/2011 |
| WO | 2011/131044 A1 | 10/2011 |
| WO | 2011/131221 A1 | 10/2011 |
| WO | 2013/110339 A1 | 8/2013 |

OTHER PUBLICATIONS

3GPP TSG RAN WG3#75bis Meeting, Prague, Czech, May 21-25, 2012, R3-121055.*
3GPP TS 36.331 V12.3.0, "3rd Generation Partnership Project; Technical Specification Group Radio Access Network; Evolved Universal Terrestrial Radio Access (E-UTRA); Radio Resource Control (RRC); Protocol specification (Release 12)", Sep. 2014.
3GPP TS 36.423 V12.3.0, "3rd Generation Partnership Project; Technical Specification Group Radio Access Network; Evolved Universal Terrestrial Radio Access Network (E-UTRAN); X2 application protocol (X2AP) (Release 12)", Sep. 2014.
International Search Report issued for corresponding International Patent Application No. PCT/CN2012/079428, dated Apr. 11, 2013, with an English translation.
Notice of Preliminary Rejection issued by the Korean Intellectual Property Office for corresponding Korean Patent Application No. 10-2015-7000690, dated Feb. 1, 2016, with English translation.
Nokia Siemens Networks, "The way forward for intra-LTE MRO enhancements", Agenda Item: 11.1.2, 3GPP TSG-RAN WG3 Meeting #75, R3-120399, Dresden, Germany, Feb. 6-10, 2012.
Extended European search report with supplementary European search report and the European search opinion issued by the European Patent Office for corresponding European Patent Application No. 12882439.8, dated Mar. 11, 2016.
Huawei: "HetNet MRO:UE context identification", Agenda Item: 11.2.1, 3GPP TSG RAN WG3 Meeting #75bis, R3-121055, Prague, Czech, May 21-25, 2012.
Huawei: "Source cell detection and correction of too-early handover", Agenda Item: 10.2.1, 3GPP TSG-RAN WG3 Meeting #65, R3-091764, Shenzhen, China, Aug. 24-28, 2009.
Ericsson: Change Request for "Ciphering activation time for DPCH", 3GPP TSG-RAN WG2 Meeting #17, R2-002384, Sophia Antipolis, France, Nov. 13-17, 2000.
Rapporteur (Samsung): Change Request for "Introduction of Carrier Aggregation and UL/DL MIMO", 3GPP TSG-RAN WG2 Meeting #72, R2-106856, Jacksonville, US, Nov. 15-19, 2010.
Nokia Siemens Networks: "RLF Indication and shortMAC-I", Agenda Item: 10.2, 3GPP TSG-RAN WG3 Meeting #170bis, R3-110211, Dublin, Ireland, Jan. 17-21, 2011.
Notice of the Final Rejection issued for corresponding Korean Patent Application No. 10-2015-7000690 dated Aug. 30, 2016, with an English translation.
Notice of Preliminary Rejection issued for corresponding Korean Patent Application No, 10-2017-7007848, dated May 18, 2017, with an English translation.
First Notification of Office Action and Search Report issued by the State Intellectual Property Office of China for corresponding Chinese Patent Application No. 201280072408.9, dated Jun. 2, 2017, with an English translation.
Notice of Reasons for Rejection issued by the Japan Patent Office for corresponding Japanese Patent Application No. 2015-524585 dated Oct. 10, 2017, with an English translation.
3GPP TS 36.331 V10.0.0, "3rd Generation Partnership Project; Technical Specification Group Radio Access Network; Evolved Universal Terrestrial Radio Access (E-UTRA); Radio Resource Control (RRC); Protocol specification (Release 10)", Dec. 2010.
Notification of Reasons for Refusal issued by the Japan Patent Office for corresponding Japanese Patent Application No. 2016-201162, dated Dec. 12, 2017, with an English translation.
Second Notification of Office Action issued by the State Intellectual Property Office of China for corresponding Chinese Patent Application No. 201280072408.9, dated Jan. 19, 2018, with an English translation.

* cited by examiner

UE CONTEXT IDENTIFICATION METHOD, UE AND BASE STATION

CROSS-REFERENCE TO RELATED APPLICATIONS

This is a continuation of International Application No. PCT/CN2012/079428, filed on Jul. 31, 2012, now pending, the contents of which are herein wholly incorporated by reference.

TECHNICAL FIELD

The present disclosure relates to the field of communications, and in particular to a UE context identification method, UE and a base station.

BACKGROUND

In order that a base station performs optimization of mobility performance, a function of self-optimization is defined in an LTE-A system. And in order to further ensure accuracy of such optimization, it is under study in 3GPP that a base station is capable of identifying a context of UE in optimizing mobility performance of the UE. Hence, the UE may currently carry terminal identity information of the UE in some messages, such as a radio link failure (RLF) report, so that the base station obtains the context of the UE according to the information.

However, it was found by the inventors that in the existing scheme, identity information of a last serving cell is always carried in the RLF report of the UE, which results in that the base station cannot identify the context of the UE in some scenarios.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Embodiments of the present disclosure provide a UE context identification method, UE and a base station, with an object being to enhance an action of the base station or an action of the UE, thereby ensuring that the base station is always able to identify the context of the UE.

According to an aspect of the embodiments of the present disclosure, there is provided a UE context identification method, including:

obtaining a first terminal identity of UE by a first base station, wherein the first terminal identity is transmitted by the UE to a network side after connection failure;

finding a second terminal identity corresponding to a second base station in a context of the UE according to the first terminal identity; and transmitting to the second base station a handover report containing the second terminal identity, so that the second base station finds the context of the UE according to the second terminal identity.

According to another aspect of the embodiments of the present disclosure, there is provided a UE context identification method, wherein UE is handed over from a second base station to a first base station, and the method includes:

reading a handover request acknowledge message by the second base station, so as to acquire a first terminal identity corresponding to the first base station; and finding a context of the UE according to the first terminal identity when a handover report containing the first terminal identity is received.

According to still another aspect of the embodiments of the present disclosure, there is provided a UE context identification method, including:

storing a second terminal identity by UE, the second terminal identity being generated after the UE receives a handover command; and transmitting a link failure report by the UE, so that a base station receiving the link failure report finds a context of the UE.

According to still another aspect of the embodiments of the present disclosure, there is provided a base station, wherein UE is handed over from a second base station to the base station, and the base station includes:

an identity obtaining unit configured to obtain a first terminal identity of the UE, wherein the first terminal identity is transmitted by the UE to a network side after connection failure;

an identity finding unit configured to find a second terminal identity corresponding to the second base station in a context of the UE according to the first terminal identity; and a report transmitting unit configured to transmit to the second base station a handover report containing the second terminal identity, so that the second base station finds the context of the UE according to the second terminal identity.

According to still another aspect of the embodiments of the present disclosure, there is provided a base station, wherein UE is handed over from the base station to a first base station, and the base station includes:

a message reading unit configured to read a handover request acknowledge message, so as to acquire a first terminal identity corresponding to the first base station; and a context finding unit configured to find a context of the UE according to the first terminal identity when a handover report containing the first terminal identity is received.

According to still another aspect of the embodiments of the present disclosure, there is provided UE, including:

an identity storing unit configured to store a second terminal identity generated after a handover command is received; and an information transmitting unit configured to transmit a link failure report, so that an base station receiving the link failure report finds a context of the UE.

According to still another aspect of the embodiments of the present disclosure, there is provided a communication system, including the base station as described above, or including the UE as described above.

According to still another aspect of the embodiments of the present disclosure, there is provided a computer-readable program, wherein when the program is executed in UE, the program enables a computer to carry out the UE context identification method as described above in the UE.

According to still another aspect of the embodiments of the present disclosure, there is provided a storage medium in which a computer-readable program is stored, wherein the computer-readable program enables a computer to carry out the UE context identification method as described above in UE.

According to still another aspect of the embodiments of the present disclosure, there is provided a computer-readable program, wherein when the program is executed in a base station, the program enables a computer to carry out the UE context identification method as described above in the base station.

According to still another aspect of the embodiments of the present disclosure, there is provided a storage medium in which a computer-readable program is stored, wherein the computer-readable program enables a computer to carry out the UE context identification method as described above in a base station.

An advantage of the embodiments of the present disclosure exists in that by enhancing an action of the base station or an action of the UE, it is ensured that the base station is always able to identify the context of the UE.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Embodiment 1

An embodiment of the present disclosure provides a UE context identification method, wherein UE is handed over from a second base station to a first base station, and this embodiment is applicable to the first base station.

Figure 1:
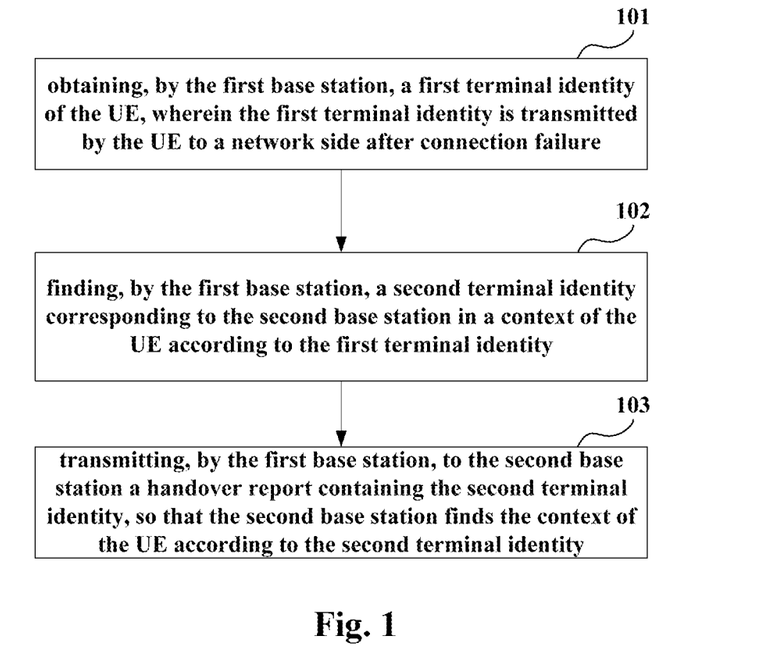
FIG. 1 is a flowchart of the UE context identification method of Embodiment 1 of the present disclosure.

FIG. 1 is a flowchart of the UE context identification method of this embodiment. As shown in FIG. 1, the identification method includes:

step 101: obtaining, by the first base station, a first terminal identity of the UE, wherein the first terminal identity is transmitted by the UE to a network side after connection failure;

step 102: finding, by the first base station, a second terminal identity corresponding to the second base station in a context of the UE according to the first terminal identity; and step 103: transmitting, by the first base station, to the second base station a handover report containing the second terminal identity, so that the second base station finds the context of the UE according to the second terminal identity.

In this embodiment, the first base station may be a target base station of a handover, and may be a transmission side of a handover report (see TS36.423 for details); and the second base station may be a source base station of the handover, and may be a reception side of the handover report. The UE is handed over from the second base station to the first base station, and experiences a connection failure, which may be, for example, a radio link failure (RLF), and may also be a handover failure (HOF).

In this embodiment, steps 102 and 103 may be executed in the following cases. For example, a type of the handover report is that the handover is too early or it is handed over to a wrong cell; or a type of the connection failure is a radio link failure; or radio resource control (RRC) connection reestablishment is unsuccessful after the connection failure. However, the present disclosure is not limited thereto, and a condition of execution may be determined according to an actual situation.

In this embodiment, after the connection failure occurs, the UE may transmit the first terminal identity to the network side, such as carrying UE_identity_1 information in transmitting the RLF report; wherein the first terminal identity may be a cell radio network temporary identity (C-RNTI), or a short media access control identity (shortMAC-I) (refer to TS36.331 for details), or a C-RNTI and a shortMAC-I. However, the present disclosure is not limited thereto, and detailed information may be determined according to an actual situation.

In this embodiment, the first base station may obtain the first terminal identity of the UE. The first terminal identity of the UE may be obtained by directly receiving an RLF report transmitted by the UE; or the first terminal identity of the UE may be obtained from a message transmitted by another base station at the network side.

In this embodiment, after obtaining the first terminal identity, the first base station may judge whether the first terminal identity is a C-RNTI_1 allocated by itself to the UE, or whether the first terminal identity is a shortMAC-I_1 corresponding to the first base station. If yes, the first base station may find in the context of the UE according to the first terminal identity, so as to find the second terminal identity corresponding to the second base station;

wherein, the second terminal identity may be a cell radio network temporary identity (C-RNTI), or a short media access control identity (shortMAC-I), or a C-RNTI and a shortMAC-I. However, the present disclosure is not limited thereto, and detailed information may be determined according to an actual situation.

In this embodiment, the first base station may add the found second terminal identity (for example, a shortMAC-I_2 allocated by the second base station to the UE, or a shortMAC-I_2 generated when the UE is handed over from the second base station to the first base station) into the handover report. And the first base station may transmit the handover report to the second base station after receiving RLF indication (refer to TS36.423 for details) from another base station.

In this embodiment, the second base station may find the context of the UE according to the second terminal identity after receiving the handover report.

It can be seen from the above embodiment that the source base station is enabled to find the context of the UE according to the corresponding terminal identity, by transmitting the terminal identity corresponding to the source base station by the target base station to the source base station.

Embodiment 2

An embodiment of the present disclosure provides a UE context identification method, wherein the UE is handed over from a second base station to a first base station, and this embodiment is applicable to the second base station.

Figure 2:
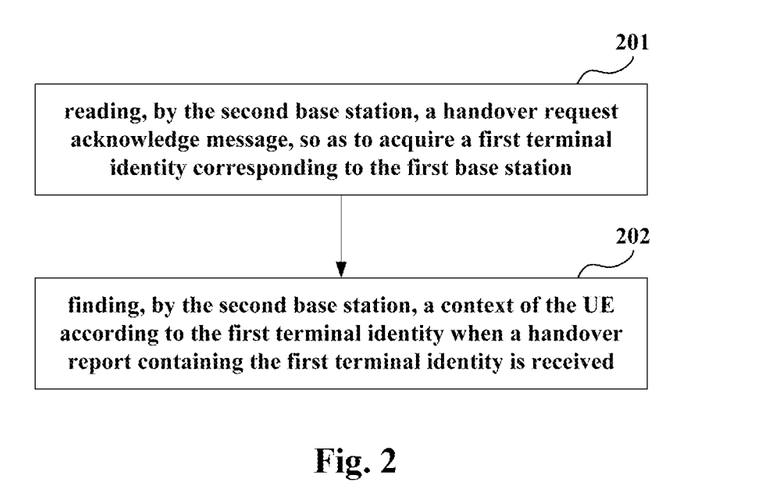
FIG. 2 is a flowchart of the UE context identification method of Embodiment 2 of the present disclosure.

FIG. 2 is another flowchart of the UE context identification method of the embodiment. As shown in FIG. 2, the identification method includes:

step 201: reading, by the second base station, a handover request acknowledge message, so as to acquire a first terminal identity corresponding to the first base station; and step 202: finding, by the second base station, a context of the UE according to the first terminal identity when a handover report containing the first terminal identity is received.

In this embodiment, the first base station may be a target base station of a handover, and may be a transmission side of a handover report; and the second base station may be a source base station of the handover, and may be a reception side of the handover report. The UE is handed over from the second base station to the first base station, and experiences a connection failure, which may be, for example, an RLF, and may also be a handover failure (HOF).

In this embodiment, when the UE is handed over from the second base station to the first base station, the second base station may receive a handover request acknowledge message during handover preparation (refer to TS36.423 for details). And the second base station may read the handover request acknowledge message, so as to acquire the first terminal identity corresponding to the first base station;

wherein the first terminal identity may be a cell radio network temporary identity (C-RNTI), or a short media access control identity (shortMAC-I), or a C-RNTI and a shortMAC-I. However, the present disclosure is not limited thereto, and detailed information may be determined according to an actual situation.

In this embodiment, the second base station may store the first terminal identity (such as a C-RNTI_1 or a shortMAC-I_1), thereby associating the first terminal identity with the UE. For example, mapping relationship between the first terminal identity and the UE may be established, and the first terminal identity may be associated with the second terminal identity of the UE (such as a C-RNTI_2 or a shortMAC-I_2) corresponding to the second base station.

In this embodiment, the second base station may find the context of the UE according to the first terminal identity in receiving the handover report containing the first terminal identity.

It can be seen from the above embodiment that the source base station is enabled to associate the UE with the terminal identity corresponding to the target base station by obtaining the terminal identity corresponding to the target base station from the handover request acknowledge message. Therefore, the source base station may find the context of the UE according to the terminal identity in receiving the handover report.

Embodiment 3

An embodiment of the present disclosure provides a UE context identification method, which is applicable to UE.

Figure 3:
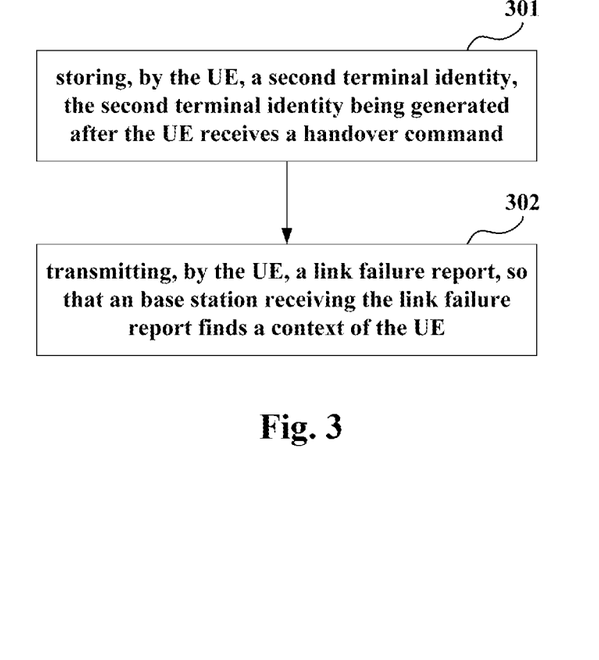
FIG. 3 is a flowchart of the UE context identification method of Embodiment 3 of the present disclosure.

FIG. 3 is still another flowchart of the UE context identification method of the embodiment. As shown in FIG. 3, the identification method includes:

step 301: storing, by the UE, a second terminal identity, the second terminal identity being generated after the UE receives a handover command; and step 302: transmitting, by the UE, a link failure report, so that an base station receiving the link failure report finds a context of the UE.

In this embodiment, different from the prior art, the UE may generate the second terminal identity after receiving the handover command (refer to TS36.331 for details). The second terminal identity may be a C-RNTI allocated by the base station where the UE is present after receiving the handover command, or a shortMAC-I generated when the UE is handed over from a source cell to a target cell, or may be a C-RNTI and a shortMAC-I.

In this embodiment, the UE may transmit the link failure report after a connection failure (such as a radio link failure (RLF) or a handover failure (HOF)). The relevant art may be referred to for detailed implementation.

In a mode of implementation, the UE may add the second terminal identity into the RLF report after the connection failure (such as an RLF or a HOF) occurs, and transmit the RLF report to the network side. A base station receiving the RLF report may find the context of the UE according to the second terminal identity, and may optimize a parameter of mobility performance.

Figure 4:
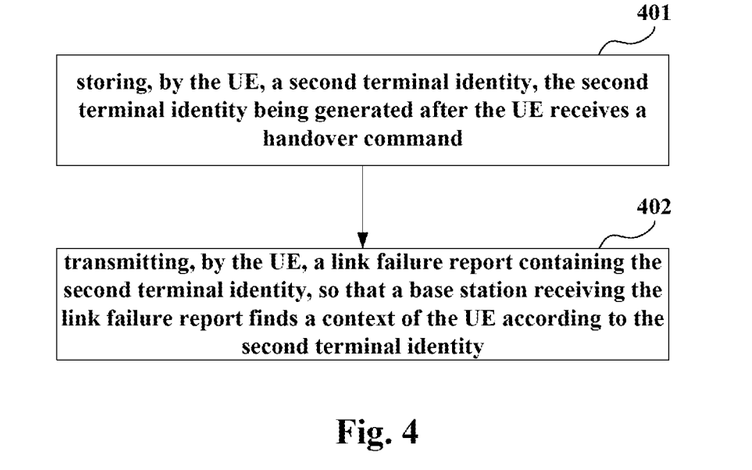
FIG. 4 is another flowchart of the UE context identification method of Embodiment 3 of the present disclosure.

FIG. 4 is further still another flowchart of the UE context identification method of the embodiment. As shown in FIG. 4, the identification method includes:

step 401: storing, by the UE, a second terminal identity, the second terminal identity being generated after the UE receives a handover command; and step 402: transmitting, by the UE, a link failure report containing the second terminal identity, so that a base station receiving the link failure report finds a context of the UE according to the second terminal identity.

In another mode of implementation, the UE may have a timer, and the timer may be started according to the handover command. However, the present disclosure is not limited thereto, and a particular mode of implementation may be determined according to an actual situation.

Figure 5:
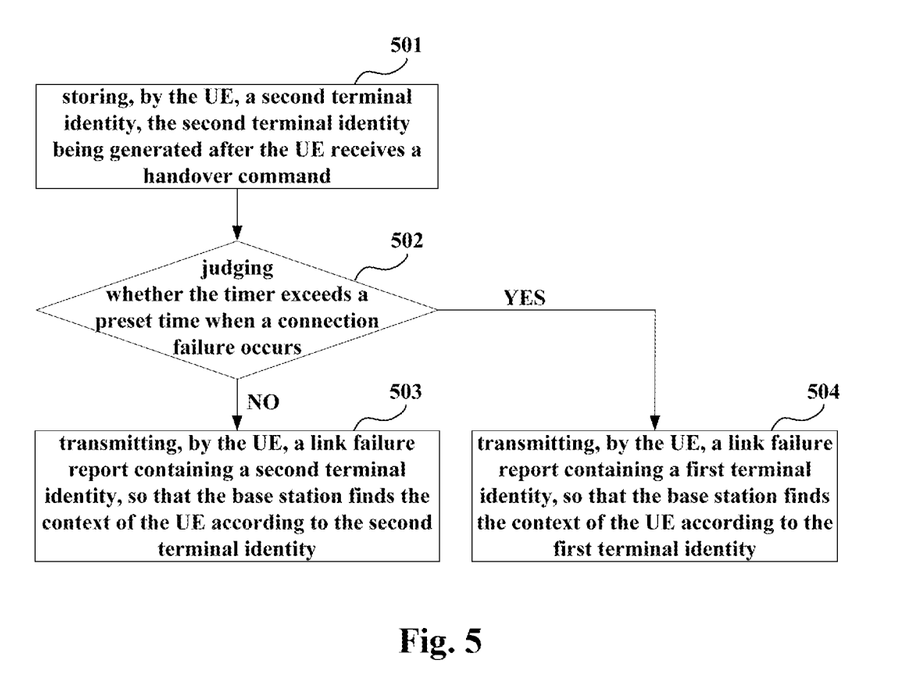
FIG. 5 is still another flowchart of the UE context identification method of Embodiment 3 of the present disclosure.

FIG. 5 is yet still another flowchart of the UE context identification method of the embodiment. As shown in FIG. 5, the identification method includes:

step 501: storing, by the UE, a second terminal identity, the second terminal identity being generated after the UE receives a handover command;

step 502: judging, by the UE, whether the timer exceeds a preset time when a connection failure occurs; executing step 503 when the timer does not exceed the preset time; and executing step 504 when the timer exceeds the preset time;

wherein, the timer may be started according to the handover command; for example, the timer may be started after the UE completes the handover (such as successfully transmitting an RRCConnectionReconfigurationComplete message, refer to TS36.331 for details); the preset time of the timer may be configured by a base station, and may also be designated in a protocol, or may be generated by the UE itself;

step 503: transmitting, by the UE, a link failure report containing a second terminal identity, so that the base station finds the context of the UE according to the second terminal identity; and step 504: transmitting, by the UE, a link failure report containing a first terminal identity, so that the base station finds the context of the UE according to the first terminal identity;

wherein the first terminal identity is generated when a link failure occurs in the UE, or is generated when radio resource control (RRC) connection is reestablished after the link failure occurs; and the first terminal identity may be a cell radio network temporary identity (C-RNTI) and/or a short media access control identity (shortMAC-I).

In this embodiment, as the second terminal identity is generated after the UE receives the handover command, when the second terminal identity is a short media access control identity (shortMAC-I), the context of the UE may be identified uniquely even if a case where the base station allocates repeated C-RNTIs occurs.

It can be seen from the above embodiment that by generating the terminal identity by the UE after receiving the handover command, the base station is enabled to identify the context of the UE according to the terminal identity, and optimize a parameter of mobility performance.

Embodiment 4

An embodiment of the present disclosure provides a base station, wherein the base station is a first base station, and UE is handed over from a second base station to the base station. The embodiment of the present disclosure corresponds to Embodiment 1, and repeated parts shall not be described any further.

Figure 6:
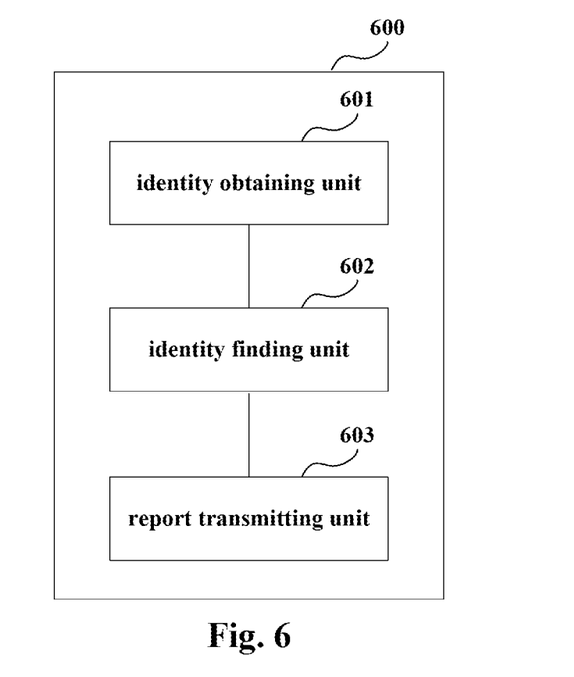
FIG. 6 is a schematic diagram of the structure of the base station of Embodiment 4 of the present disclosure.

FIG. 6 is a schematic diagram of the structure of the base station of the embodiment of the present disclosure. As shown in FIG. 6, the base station 600 includes: an identity obtaining unit 601, an identity finding unit 602 and a report transmitting unit 603; and the relevant art may be referred to for other parts of the base station 600;

wherein, the identity obtaining unit 601 is configured to obtain a first terminal identity of the UE; wherein the first terminal identity is transmitted by the UE to a network side after connection failure; the identity finding unit 602 is configured to find a second terminal identity corresponding to the second base station in a context of the UE according to the first terminal identity; and the report transmitting unit 603 is configured to transmit to the second base station a handover report containing the second terminal identity, so that the second base station finds the context of the UE according to the second terminal identity.

In this embodiment, the identity obtaining unit 601 may obtain the first terminal identity of the UE by receiving a link failure report transmitted by the UE; or the identity obtaining unit 601 may obtain the first terminal identity of the UE from a message transmitted by another base station at the network side.

In this embodiment, the first terminal identity or the second terminal identity may be a cell radio network temporary identity (C-RNTI) and/or a short media access control identity (shortMAC-I).

It can be seen from the above embodiment that the source base station is enabled to find the context of the UE according to the corresponding terminal identity by transmitting the terminal identity corresponding to the source base station by the target base station to the source base station.

Embodiment 5

An embodiment of the present disclosure provides a base station, wherein the base station is a second base station, and UE is handed over from the second base station to a first base station. The embodiment of the present disclosure corresponds to Embodiment 2, and repeated parts shall not be described any further.

Figure 7:
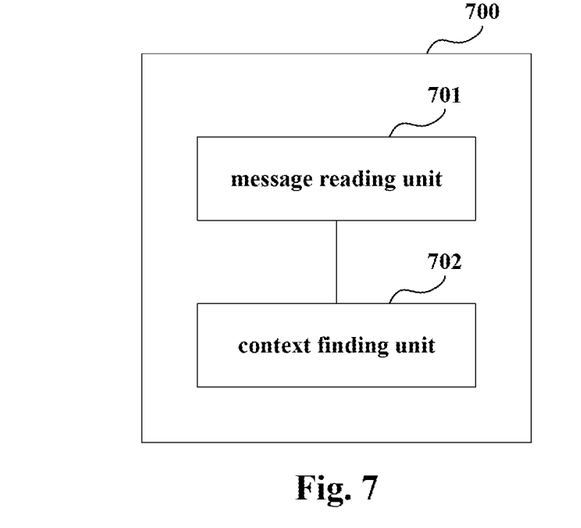
FIG. 7 is a schematic diagram of the structure of the base station of Embodiment 5 of the present disclosure.

FIG. 7 is a schematic diagram of the structure of the base station of the embodiment of the present disclosure. As shown in FIG. 7, the base station 700 includes: a message reading unit 701 and a context finding unit 702; and the relevant art may be referred to for other parts of the base station 700;

wherein, the message reading unit 701 is configured to read a handover request acknowledge message, so as to acquire a first terminal identity corresponding to the first base station; and the context finding unit 702 is configured to find a context of the UE according to the first terminal identity when a handover report containing the first terminal identity is received.

In this embodiment, the first terminal identity may be a cell radio network temporary identity (C-RNTI) and/or a short media access control identity (shortMAC-I).

It can be seen from the above embodiment that the source base station is enabled to associate the UE with the terminal identity corresponding to the target base station by obtaining the terminal identity corresponding to the target base station from the handover request acknowledge message. Therefore, the source base station may find the context of the UE according to the terminal identity in receiving the handover report.

Embodiment 6

An embodiment of the present disclosure provides UE. The embodiment of the present disclosure corresponds to Embodiment 3, and repeated parts shall not be described any further.

Figure 8:
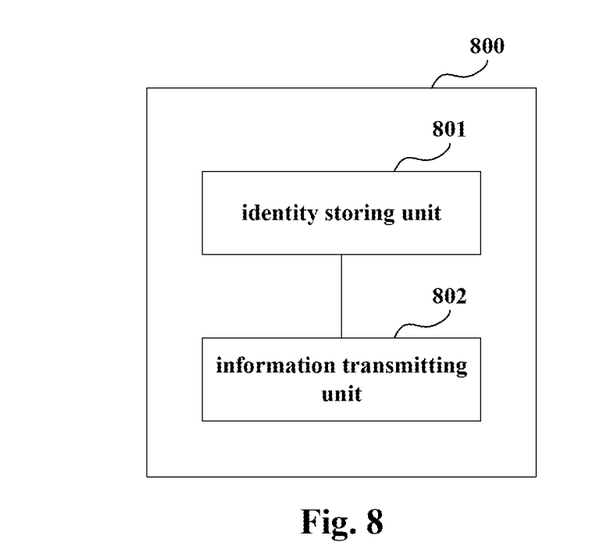
FIG. 8 is a schematic diagram of the structure of the UE of Embodiment 6 of the present disclosure.

FIG. 8 is a schematic diagram of the structure of the UE of the embodiment of the present disclosure. As shown in FIG. 8, the UE 800 includes: an identity storing unit 801 and an information transmitting unit 802; and the relevant art may be referred to for other parts of the UE 800;

wherein, the identity storing unit 801 is configured to store a second terminal identity generated after a handover command is received, and the information transmitting unit 802 is configured to transmit a link failure report, so that a base station receiving the link failure report finds a context of the UE.

In a mode of implementation, the information transmitting unit 802 is configured to transmit the link failure report containing the second terminal identity, so that the base station receiving the link failure report finds the context of the UE according to the second terminal identity.

In another mode of implementation, the UE may have a timer. And a preset time of the timer is configured by a network side, or is configured by the UE, or is preset according to a standard.

Figure 9:
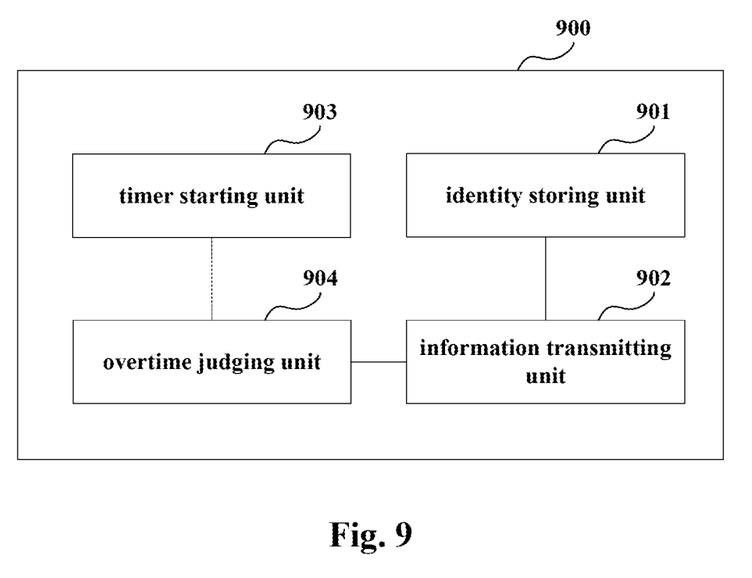
FIG. 9 is another schematic diagram of the structure of the UE of Embodiment 6 of the present disclosure.

FIG. 9 is another schematic diagram of the structure of the UE of the embodiment of the present disclosure. As shown in FIG. 9, the UE 900 includes: an identity storing unit 901 and an information transmitting unit 902.

As shown in FIG. 9, the UE 900 may further include a timer starting unit 903 and an overtime judging unit 904; wherein, the timer starting unit 903 is configured to start the timer, and the overtime judging unit 904 is configured to judge whether the timer exceeds a preset time when a connection failure occurs.

And the information transmitting unit 902 is configured to transmit a link failure report containing the second terminal identity when a connection failure (such as an RLF or a HOF) occurs at a time when the timer does not exceed the preset time, so that the base station finds the context of the UE according to the second terminal identity; and to transmit a link failure report containing a first terminal identity when a connection failure (such as an RLF or an HOF) occurs at a time when the timer exceeds the preset time, so that the base station finds the context of the UE according to the first terminal identity; wherein the first terminal identity is generated when a link failure occurs at the UE, or is generated when RRC connection is reestablished after the link failure occurs.

In this embodiment, the first terminal identity or the second terminal identity is a cell radio network temporary identity (C-RNTI) and/or a short media access control identity (shortMAC-I).

It can be seen from the above embodiment that by generating the terminal identity by the UE after receiving the handover command, the base station is enabled to identify the context of the UE according to the terminal identity, and optimize a parameter of mobility performance.

An embodiment of the present disclosure further provides a communication system, including the base station as described in Embodiment 4, or including the base station as described in Embodiment 5, or including the UE as described in Embodiment 6.

An embodiment of the present disclosure further provides a computer-readable program, wherein when the program is executed in UE, the program enables a computer to carry out the UE context identification method as described in Embodiment 3 in the UE.

An embodiment of the present disclosure further provides a storage medium in which a computer-readable program is stored, wherein the computer-readable program enables a computer to carry out the UE context identification method as described in Embodiment 3 in UE.

An embodiment of the present disclosure further provides a computer-readable program, wherein when the program is executed in a base station, the program enables a computer to carry out the UE context identification method as described in Embodiment 1 or 2 in the base station.

An embodiment of the present disclosure further provides a storage medium in which a computer-readable program is stored, wherein the computer-readable program enables a computer to carry out the UE context identification method as described in Embodiment 1 or 2 in a base station.

The above apparatus and method of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in FIGS. 13-20 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A base station, wherein User Equipment (UE) is handed over from a second base station to the base station, and the base station comprises:
   a memory configured to store a plurality of instructions; and
   processor circuitry coupled to the memory and configured to:
      execute the plurality of instructions,
      obtain a first terminal identity of the UE, wherein the first terminal identity is transmitted by the UE to a network side after a connection failure;
      find a second terminal identity corresponding to the second base station in a context of the UE according to the first terminal identity when determined that the first terminal identity is allocated by the base station to the UE or corresponds to the base station; and
      transmit to the second base station a handover report containing the second terminal identity, so that the second base station finds the context of the UE according to the second terminal identity.

2. The base station according to claim 1, wherein processor circuitry is configured to:

obtain unit obtains the first terminal identity of the UE by receiving a link failure report transmitted by the UE; or
obtain the first terminal identity of the UE from a message transmitted by another base station at the network side.

3. The base station according to claim 1, wherein the first terminal identity or the second terminal identity is a cell radio network temporary identity (C-RNTI) and/or a short media access control identity (shortMAC-I).

4. A base station, wherein User Equipment (UE) is handed over from the base station to a first base station, and the base station comprises:
   a memory configured to store a plurality of instructions; and
   processor circuitry coupled to the memory and configured to:
      execute the plurality of instructions,
      read a handover request acknowledge message, so as to acquire a first terminal identity corresponding to the first base station and establish mapping relationship between the first terminal identity and the UE; and
      find a context of the UE according to the established mapping relationship when a handover report containing the first terminal identity is received.

5. The base station according to claim 4, wherein the first terminal identity is a cell radio network temporary identity (C-RNTI) and/or a short media access control identity (shortMAC-I).

6. User Equipment (UE), comprising:
   a memory configured to store a plurality of instructions; and
   processor circuitry coupled to the memory and configured to:
      execute the plurality of instructions,
      store a second terminal identity generated after a handover command is received; and
      transmit a link failure report containing the second terminal identity or a first terminal identity, wherein a base station receiving the link failure report finds a context of the UE, and wherein, the first terminal identity is generated when a link failure occurs at the UE, or is generated when radio resource control connection is reestablished after the link failure occurs.

7. The UE according to claim 6, wherein processor circuitry is configured to: transmit the link failure report containing the second terminal identity, so that the base station receiving the link failure report finds the context of the UE according to the second terminal identity.

8. The UE according to claim 6, wherein the UE further comprises:
   the processor circuitry configured to:
   start a timer of the UE;
   determine whether the timer exceeds a preset time when a connection failure occurs; and
   transmit a link failure report containing the second terminal identity when the timer does not exceed the preset time, so that the base station finds the context of the UE according to the second terminal identity.

9. The UE according to claim 8, wherein the processor circuitry is further configured to transmit a link failure report containing the first terminal identity when the timer exceeds the preset time, so that the base station finds the context of the UE according to the first terminal identity.

10. The UE according to claim 8, wherein the preset time of the timer is configured by a network side, or is configured by the UE, or is preset according to a standard.

11. The UE according to claim 9, wherein the first terminal identity or the second terminal identity is a cell radio network temporary identity (C-RNTI) and/or a short media access control identity (shortMAC-I).

12. A communication system, comprising the base station as claimed in claim 1.

13. A communication system, comprising the base station as claimed in claim 4.

14. A communication system, comprising the UE as claimed in claim 6.

15. The UE according to claim 10, wherein the first terminal identity or the second terminal identity is a cell radio network temporary identity (C-RNTI) and/or a short media access control identity (shortMAC-I).

* * * * *